2 Sheets—Sheet 1.

A. DE B. LOVETT & E. S. GOFF.

HAY TEDDER.

No. 10,916. Reissued Mar. 27, 1888.

WITNESSES

C. M. Newman,
E. S. Newman,

INVENTORS

Antoine de B. Lovett,
Emmet S. Goff,
By their Attorneys
Baldwin Hopkins & Peyton N. PETERS, Photo-Lithographer, Washington, D.C.

A. DE B. LOVETT & E. S. GOFF.

HAY TEDDER.

No. 10,916. Reissued Mar. 27, 1888.

WITNESSES

C. M. Newman,
E. S. Newman,

INVENTORS

Antoine de B. Lovett,
By their Attorneys Emmet S. Goff,
Baldwin, Hopkins, & Peyton.

N. PETERS, Photo-Lithographer, Washington, D. C.

UNITED STATES PATENT OFFICE.

ANTOINE DE B. LOVETT AND EMMETT S. GOFF, OF GENEVA, NEW YORK.

HAY-TEDDER.

SPECIFICATION forming part of Reissued Letters Patent No. 10,916, dated March 27, 1888.

Original No. 367,007, dated July 19, 1887. Application for reissue filed January 19, 1888. Serial No. 261,167.

*To all whom it may concern:*

Be it known that we, ANTOINE DE B. LOVETT and EMMETT S. GOFF, both citizens of the United States, and residents of Geneva, in the county of Ontario, and State of New York, jointly have invented certain new and useful Improvements in Hay-Tedders; and we do hereby declare that the following is a full, clear, and exact description of the invention, which will enable others skilled in the art to which it appertains to make and use the same, reference being had to the accompanying drawings, which form a part of this specification, and in which—

Figure 1:
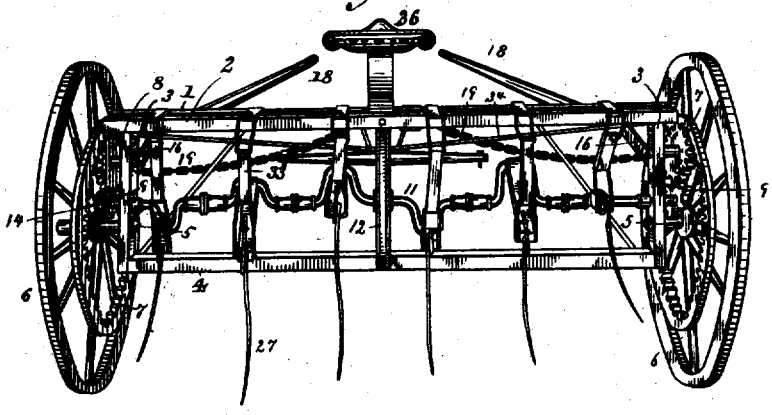
Figure 2:
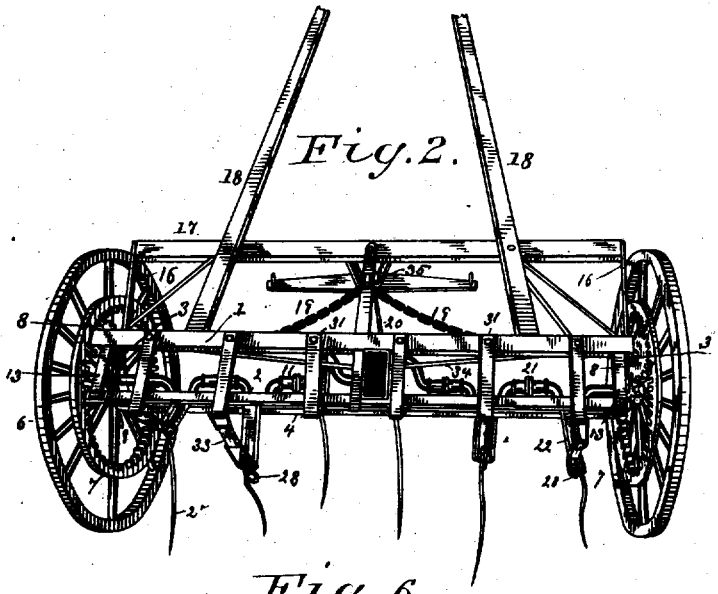
Figure 6:
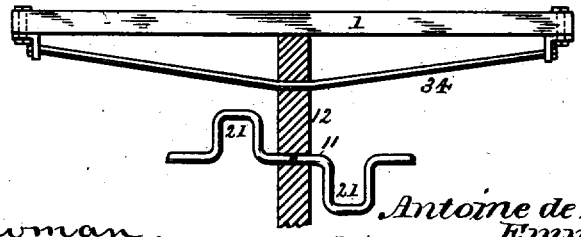
Figure 3:
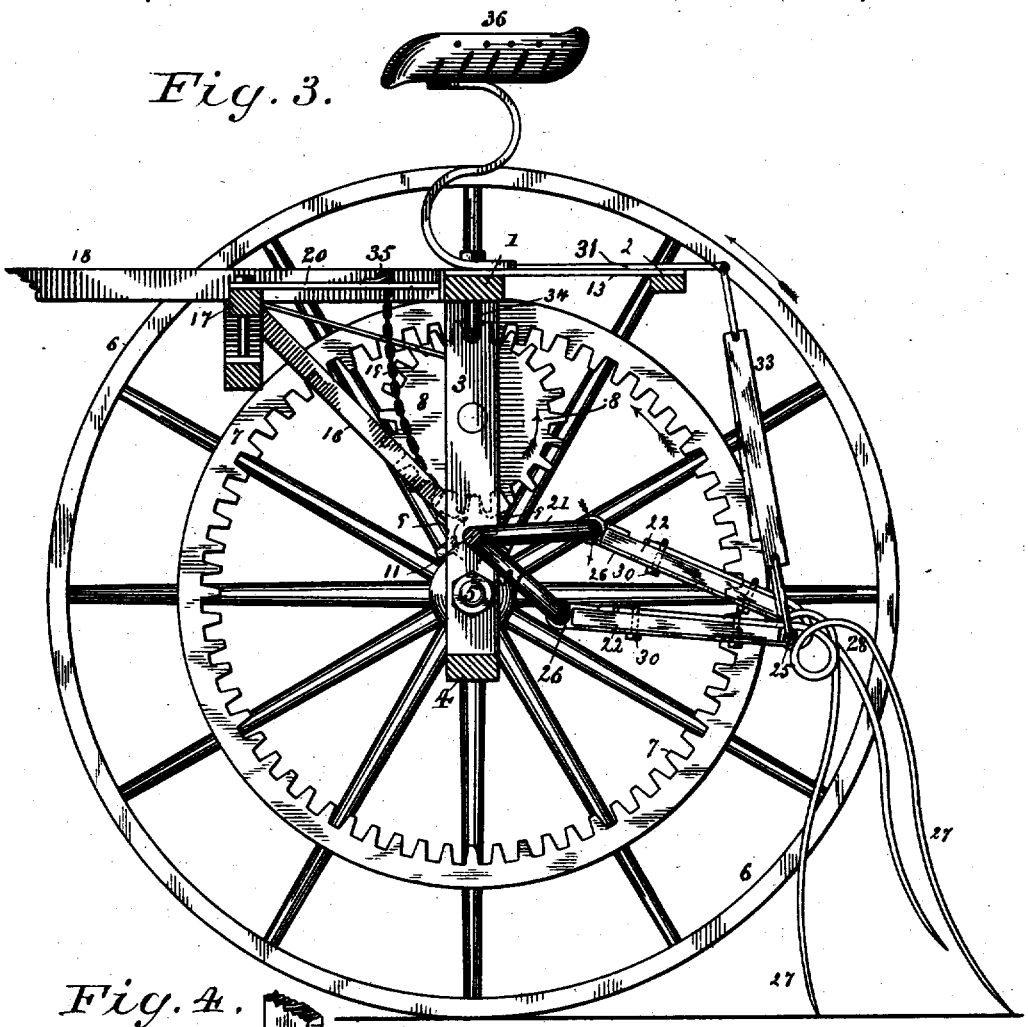
Figure 4:
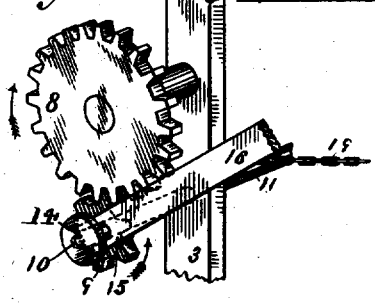
Figure 5:
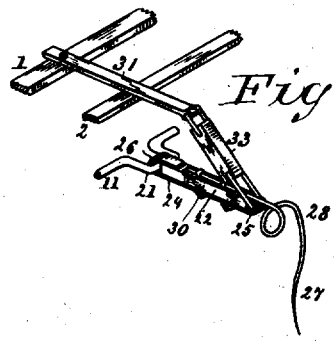

Figure 1 is a perspective rear view of our improved hay-tedder. Fig. 2 is a similar view from above the tedder. Fig. 3 is a transverse sectional view. Fig. 4 is a perspective detail view of the clutch mechanism at one end of the machine. Fig. 5 is an enlarged detail view of one of the tedder-forks and its connections, and Fig. 6 is a detail view showing the divided crank-shafts and the manner of trussing the frame of the rake.

Similar numerals of reference indicate corresponding parts in all the figures.

Our invention has relation to that class of hay-tedders in which the forks or tedders are operated by means of a crank-shaft; and it consists in the improved construction and combination of parts of such a tedder, as hereinafter more fully described and claimed.

In the accompanying drawings, the numerals 1 and 4 represent, respectively, the top and bottom bars of the tedder-frame; 3, the vertical end pieces; 12, a central brace or support, and 34 an ordinary truss-rod secured at its ends to the under side of the top bar. These are all shown as arranged in the same vertical plane. A pair of shafts, 18, is secured to the top bar by means of bolts at their rear ends, and also by suitable side braces. A cross-piece, 17, is secured to the shafts, and also to the outer or front end of a central bar, 20, the rear end of which is secured to the top bar, 1. Each of the vertical end pieces, 3, is provided with two stubs or journals, on the lower one of which, 5, the driving-wheels 6 are secured and on the other the cog-wheels 8. An interior gear-wheel, 7, is secured to each of the driving-wheels in such a manner that they will mesh with the wheels 8, and through them communicate motion to the pinions 9 upon the ends of the crank-shaft 11 for operating the tedders, the journals of the crank-shaft, the cog-wheels, and the pinions being all in the same vertical plane as those of the driving-wheels. This crank-shaft is provided with a number of double cranks, and can be made of one piece and be operated by only one set of gear-wheels at one end; but we prefer to make it in two sections, the interior ends of which are journaled in bearings in the brace-piece 12 and the outer ends in the end pieces, 3 3. The outer ends of these shafts are made polygonal, as shown at 10, or they may be provided with an ordinary fin, by means of which the pinions 9 are secured to them to cause their rotation. Secured at their forward ends to the cranks 21 of the crank-shaft by means of ordinary strap-loops, 26, are the tedder-arms 22. The rear ends of these arms, to which the forks 27 are secured, are suspended by means of links 33 from flat springs 31, which are secured at their forward ends to the top bar of the frame. These links can be hinged directly to the arms, and springs or loops, as shown, may be interposed, and the forks 27 may also be provided with a coil, 28, and be secured to the arms by means of eyebolts or staples 30, or in any other well-known manner. Each of these arms can also be made of wood and provided upon its under side with a flat strap, 24, forced into eyes 25 at the rear end and into a hooked strap or loop, 26, at its forward end, although we do not limit ourselves to any particular construction of any of these parts or the frame. As the tedder-arms are drawn forward, the springs 31 will yield sufficiently to permit the fork to pass over the hay or any obstruction. They also yield to obstructions encountered on the downward stroke, and thus avoid concussions so fatal to other machines, the change in pressure occurring just when the point of the fork stops going toward the ground and begins going toward the hay; but after they have caught in the hay and have started backward the springs are kept from bending down too far by means of the supporting-bar 2, which is rigidly secured to, in rear of, and parallel with the top bar, 1, by means of the short horizontal end pieces, 13. By means of this construction we attach the front ends of the tedder-arms to the crank-shaft, thus securing a direct application of power, which will also permit of free lateral motion of the outer ends of the arms as the fork is passing an obstruction; and as each arm is suspended at or near its rear end from a separate spring by its link each fork can move independently of all the other forks; and the point of support of the arm has but little vertical motion, being merely the arc described by the lower ends of the suspended pendulum-links 33 in moving the length of the throw of the crank-shaft. The gearing, it will be observed, is so organized that the crank-shaft rotates in a direction opposite to that in which the interior gear-wheels, 7, and the driving-wheels turn, as shown by the arrows in the drawings, and that the cranks 21 are so arranged that each moves forward below the crank-shaft and backward above it. The crank-shaft, it will be observed, is arranged very nearly in the line of the axles of the driving-wheels and between them, while the point of suspension of the links is above and in rear of the crank-shaft. The result of this arrangement, together with the method of suspending the rear ends of the tedder-arms from the pendulum-links 33, while their forward ends are connected with the crank-shaft, is quickly to lift the points of the forks 27 above the level of the crank-shaft as they move forward, thus enabling them readily to pass over the hay or obstructions, to turn their points downward rapidly just before they begin to move backward, to give them a quick backward and upward or lifting thrust to throw the hay well out, and then a quick movement forward, with their points elevated, to clear obstructions, as before explained. It will also be observed, from an inspection of the drawings, that our improved organization brings the cranks, links, and tedder-arms not only within the circle of the driving-wheels, but almost within that of the main gear-wheels. The advantages of such a compact apparatus, not only in economy of construction, but in efficiency of operation, will be evident to those skilled in the art.

When it is desired to throw either or both sections of the crank-shaft out of operation, the driver from his seat 36 places his feet upon the chains 19 and pushes them down. The inner end of each of these chains is attached to the bar 20, and its outer end to the rear end of the spring-bar 16, which is secured at its forward end to the outer end of the cross-piece 17, and at its forked or slotted rear end, 15, to the pinion 9, the pinion being provided with a grooved collar, 14, with which the forked end of the spring 16 engages. This causes the pinion to be drawn inward upon the end of the crank-shaft and out of engagement with the cog-wheel 8. As soon as the chains are released, the springs force the pinions 9 back into engagement and put the crank-shaft again into operation. In this manner a small obstruction can be passed without stopping the entire length of the sectional crank-shaft. When it is desired to pass from one field to another, the chains can be drawn in and secured upon a hook, 35, thus holding the pinions at each end out of engagement.

We are aware that it is old to hinge the forward ends of tedder-arms to a crank-shaft above an axle, and to pivot them intermediate of their length to links hinged at bottom to the axle, as in Warren's patent of June 21, 1870, No. 104,669. We are also aware that the upper ends of the tedder-arms have been pivoted to a crank-shaft beneath and in front of the axle and working through holes in a board in front of and below said axle, as in La Dow's patent of March 28, 1871, No. 113,066. In both of these patents a compact arrangement of the mechanism is shown, and the crank-shaft rotates in a direction opposite to that of the driving-wheels. Both of these machines, however, differ from ours in organization and operation, as above explained.

Having thus described our invention, we claim and desire to secure by Letters Patent of the United States—

1. In a hay-tedder, the combination of a frame, a fork-operating shaft journaled therein, a movable pinion upon each end of said shaft, springs secured at their front ends to said frame and engaging by their rear ends with and holding said pinions in or out of engagement with the operating mechanism, and chains secured to said springs and frame.

2. In a hay-tedder, the combination of a frame, a fork-operating shaft journaled therein, a bar, 20, the rear end of which is secured to the top bar of the frame, a hook upon said bar 20, springs secured at their front ends to the sides of said frame and holding the operating mechanism in or out of engagement with their rear ends, and chains secured to said first-mentioned bar and to said springs, the intermediate portions of said chains being adapted to be secured upon said hook.

3. In a hay-tedder, the combination of a frame, a fork-operating shaft journaled therein, and means, substantially as described, for operating it, a supporting-bar secured to and parallel with the top bar of the frame, a series of springs secured at their forward ends to said top bar and extending rearward over and resting loosely upon said supporting-bar, tedder-arms secured to the operating-shaft, and links for securing said arms to said springs.

4. In a hay-tedder, the combination of a frame, a fork-operating shaft journaled therein substantially in the vertical plane of the axles of the driving-wheels, pendulum-links suspended from the frame above and in rear of the fork-operating shaft, and tedder-arms having their forward ends pivoted directly to the cranks of the fork-operating shaft and their rear ends pivoted to the lower ends of the links, as and for the purpose set forth.

5. In a hay-tedder, the combination of a frame, a fork-operating shaft journaled therein substantially in the vertical plane of the axles of the driving-wheels, flat springs connected at their front ends with the frame above the fork-operating shaft and extending rearwardly therefrom, pendulum-links pivoted at their upper ends to the rear ends of the springs above and in rear of the fork-operating shaft, and tedder-arms having their forward ends pivoted to the cranks of the fork-operating shaft and their rear ends pivoted to the lower ends of the links, as and for the purpose set forth.

6. In a hay-tedder, the combination of the frame, the driving-wheels, the interior gear-wheels on the driving-wheels, the cog-wheels driven thereby, the cranked fork-operating shaft, its pinions meshing with the cog-wheels, all substantially in the same vertical plane, tedder-arms pivoted at their front ends on the crank-shaft, flat springs connected at their front ends with the frame above the fork-operating shaft, and links connecting the rear ends of the tedder-arms with the springs, all combined and operating as set forth.

In testimony that we claim the foregoing as our own we have hereunto affixed our signatures in the presence of two witnesses.

A. DE B. LOVETT.
EMMETT S. GOFF.

Witnesses:
W. O'HANLON,
M. S. SANDFORD.